J. M. GOW AND F. S. DAVIS.
METER LUBRICATOR.
APPLICATION FILED JAN. 5, 1917.

1,348,559.

Patented Aug. 3, 1920.
2 SHEETS—SHEET 2.

Witnesses

Inventors
J. M. Gow
F. S. Davis
By
Attorney

UNITED STATES PATENT OFFICE.

JOHN M. GOW AND FRANK S. DAVIS, OF LANSING, MICHIGAN.

METER-LUBRICATOR.

1,348,559.  Specification of Letters Patent.  Patented Aug. 3, 1920.

Application filed January 5, 1917. Serial No. 140,861.

*To all whom it may concern:*

Be it known that we, (1) JOHN M. Gow and (2) FRANK S. DAVIS, (1) a subject of King of England, (2) a citizen of the United States, residing at (1) Lansing, (2) Lansing, in the county of (1) Ingham, (2) Ingham, and State of (1) Michigan, (2) Michigan, have invented certain new and useful Improvements in Meter-Lubricators; and we do hereby declare the following to be a full, clear, and exact description of the invention, such as will enable others skilled in the art to which it appertains to make and use the same.

This invention has for its object to provide a lubricator especially designed for use in connection with various standard types of gas meters by which the leather parts of the bellows are constantly maintained in a thoroughly lubricated condition, thereby preventing the leather from drying out and hardening to such an extent as to render the meter inaccurate in operation.

With this and other objects in view, the invention consists in the novel construction, combination and arrangement of parts as will be hereinafter specifically described, claimed and illustrated in the accompanying drawings, in which:

Figure 1:
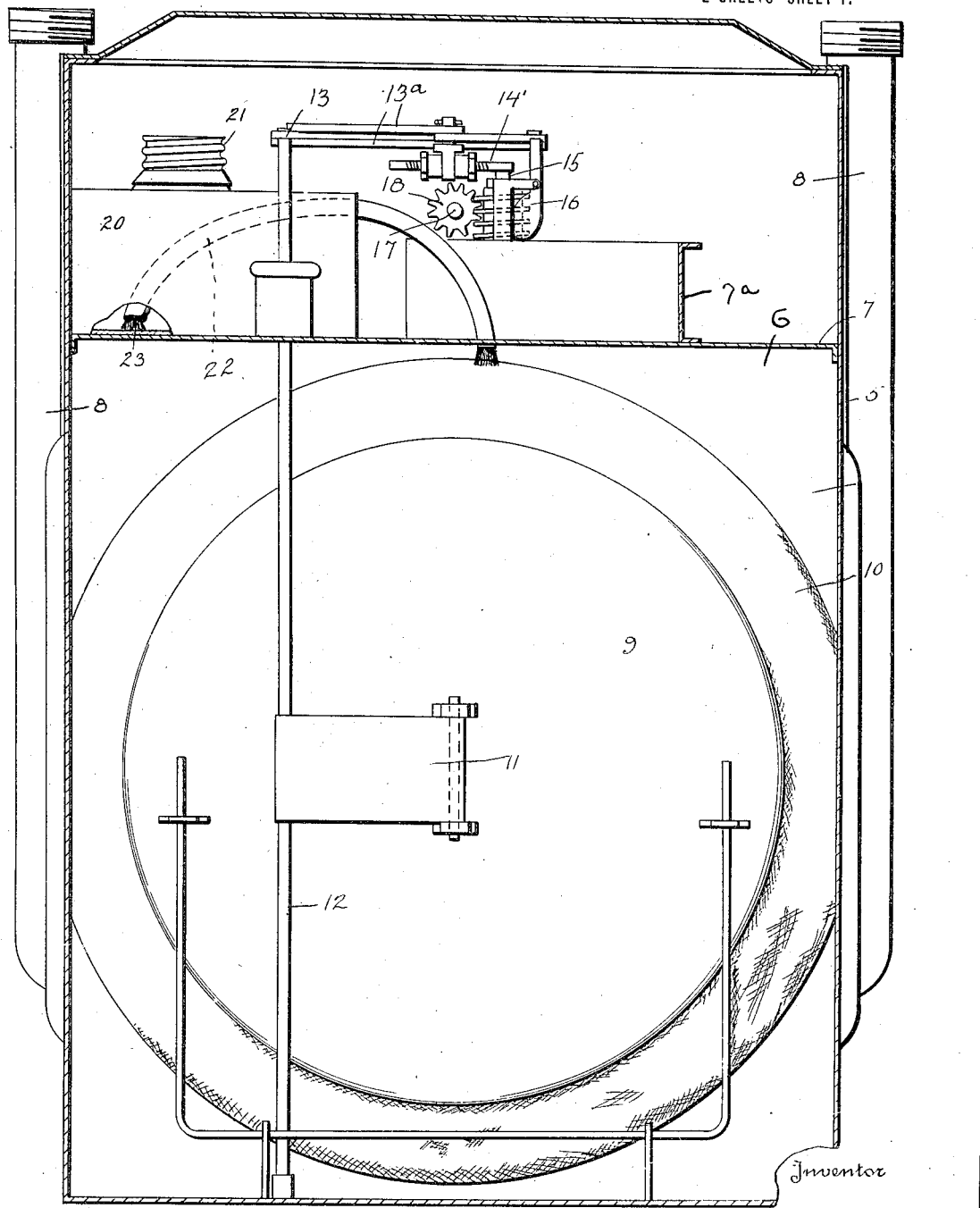
Figure 1 represents a vertical sectional view through a well known type of meter illustrating the invention applied thereto.
Figure 2:
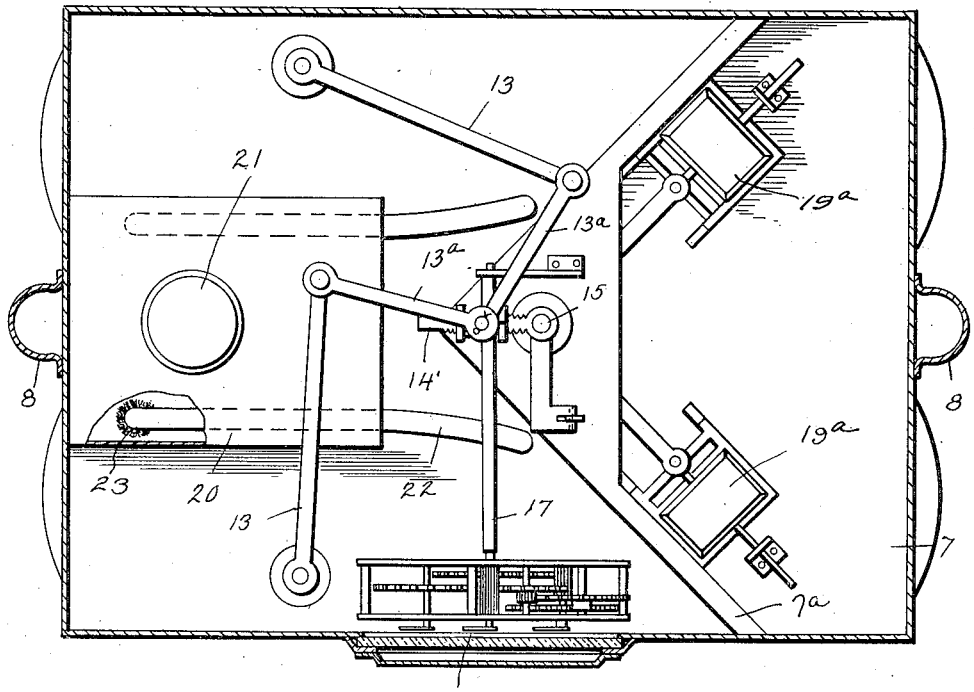
Fig. 2 represents a horizontal sectional view through the meter.

Referring to the drawings in detail, wherein similar reference numerals designate corresponding parts throughout the several views, the numeral 5 indicates generally the meter casing in which are arranged the vertical and horizontal partitions 6 and 7, respectively. The casing is provided with the usual inlet and outlet ports which communicate with the pipe sections 8 adapted for connection with the gas pipe line.

The usual bellows operating the indicator of the meter are arranged on opposite sides of the vertical partition 6, and the circumferential portions of the bellows are constructed of flexible leather 10. The front or outer plate of each bellows 9 is connected with an arm 11, which in turn is connected with vertically disposed shafts 12, carrying a crank arm 13 at their upper terminals, the crank arms 13 being arranged above the horizontal partition 7. The crank arms 13 are connected with an arm 14' of the vertically disposed shaft 15 by links 13ª, whereby the shaft 15 is rotated during the alternate expansion and contraction of the bellows 9.

The rotary movement of the vertically disposed shaft 15 is transmitted to the indicator shaft 17 through a gear wheel 18 and worm 16, whereby the indicator 19 arranged in the upper part of the casing 5 is operated during operation of the meter.

Figure 3:
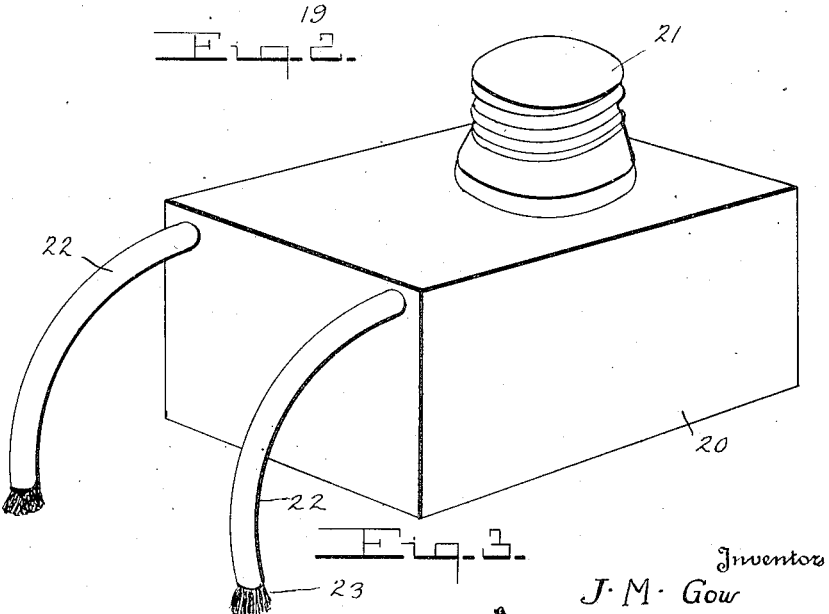
Fig. 3 represents a perspective view of the lubricator detached.

The improved lubricator, which is illustrated in detail in Fig. 3, comprises a lubricant container 20, which is formed with a filling port over which is secured a cap or closure 21, whereby the container is hermetically sealed. A pair of substantially U-shaped lubricant pipes 22 are secured at their medial portions in one of the end walls of the container 20 and each receives a strip of absorbent material 23, which is maintained saturated with the lubricant by capillary attraction.

The container 20 is supported upon the horizontal partition 7 and the lubricant pipes 22 are extended through the partition 7 on opposite sides of the vertical partition 6. The lower terminals of the exposed ends of the lubricant pipes 22 terminate directly above the leather portions 10 of the bellows 9, and are arranged in such position that during the reciprocating movement of the bellows the leather parts thereof brush over the absorbent material 23 and are thus maintained in a thoroughly lubricated condition and prevented from hardening to such an extent as to render the meter inaccurate in measuring the quantity of gas which passes therethrough. In extending the pipe through the partitions 7 the same are rigidly braced against movement of the bellows.

A substantially V-shaped partition 7ª is supported upon the horizontal partition 7 and is designed to prevent leakage of oil from the container 20 to the valves 19ª of the meter during operation of the latter.

What we claim is:

1. In combination, a gas meter having a horizontal partition providing an upper valve chamber and a lower chamber, bellows having oiled leathers or diaphragms located in said lower chamber, a hermetically sealed container located in the valve chamber, arcuate siphon tubes having their intake ends positioned in the container at points in close proximity to the bottom and one side wall thereof and curving upwardly and laterally from said points in the direction of the opposite side wall of the container and passing through said opposite side wall adjacent the top wall of the container, the tubes thence curving downwardly and forwardly and passing through said partition to position their discharge ends in said lower chamber directly above the leathers or diaphragms, and wicks filling said tubes substantially throughout the length thereof and passing beyond the discharge ends of the tubes and contacting with the leathers or diaphragms of the bellows.

2. In combination, a gas meter having a horizontal partition providing an upper valve chamber and a lower chamber, bellows having oiled leathers located in said lower chamber, a hermetically sealed lubricant container located in the valve chamber, arcuate siphon tubes having their intake ends positioned in the container and having their discharge ends positioned in said lower chamber above the leathers or diaphragms and wicks filling the tubes substantially throughout the length thereof and extending beyond the discharge ends of the tubes and contacting with the leathers or diaphragms.

In testimony whereof we affix our signatures in presence of two witnesses.

JOHN M. GOW.
FRANK S. DAVIS.

Witnesses:
EDITH A. THOMPSON,
ADELBERT MOSHER.